United States Patent
Levatter

(10) Patent No.: US 7,257,144 B2
(45) Date of Patent: Aug. 14, 2007

(54) RARE GAS-HALOGEN EXCIMER LASERS WITH BAFFLES

(75) Inventor: Jeffrey I. Levatter, Santa Fe, CA (US)

(73) Assignee: PhotoMedex, Montgomeryville, PA (US)

( * ) Notice: Subject to any disclaimer, the term of this patent is extended or adjusted under 35 U.S.C. 154(b) by 433 days.

(21) Appl. No.: 10/776,463

(22) Filed: Feb. 11, 2004

(65) Prior Publication Data

US 2005/0175055 A1    Aug. 11, 2005

(51) Int. Cl.
*H01S 3/22* (2006.01)

(52) U.S. Cl. .............................. 372/57; 372/55; 372/58

(58) Field of Classification Search .................. 372/57, 372/58

See application file for complete search history.

(56) References Cited

U.S. PATENT DOCUMENTS

| | | |
|---|---|---|
| 4,719,641 A | 1/1988 | Muller et al. |
| 4,891,818 A | 1/1990 | Levatter |
| 5,018,162 A | 5/1991 | Akins et al. |
| 6,973,112 B2 * | 12/2005 | Bliven et al. .................. 372/58 |

\* cited by examiner

*Primary Examiner*—Armando Rodriguez
(74) *Attorney, Agent, or Firm*—Knobbe, Martens, Olson & Bear, LLP

(57) ABSTRACT

An excimer laser comprises a gas chamber, electrodes for creating rare gas/halide molecules that disassociate and produce optical emission, and reflective surfaces that form an optical resonant cavity. The excimer laser further comprises flow control surfaces that define gas flow paths and that control the flow of gas within the chamber. Preferably such flow control surfaces direct the gases away from the laser optics. More preferably, the flow control surfaces shield the path of the laser beam, at least in the proximity of the laser optics, from contaminants in the gases. Less contaminants yields less contamination of the laser optics. As a result, the laser device becomes more reliable and useful over longer periods of time. In addition, the laser gases are preferably exposed only to compatible materials that react with the laser gases to produce stable reaction products having a low vapor pressure, so as to reduce contamination of the gases and the optics. High-purity nickel is preferred for components that are electrically conductive, and high-purity alumina is preferred for components that are non-electrically conductive. Preferably, incompatible materials are not used.

7 Claims, 4 Drawing Sheets

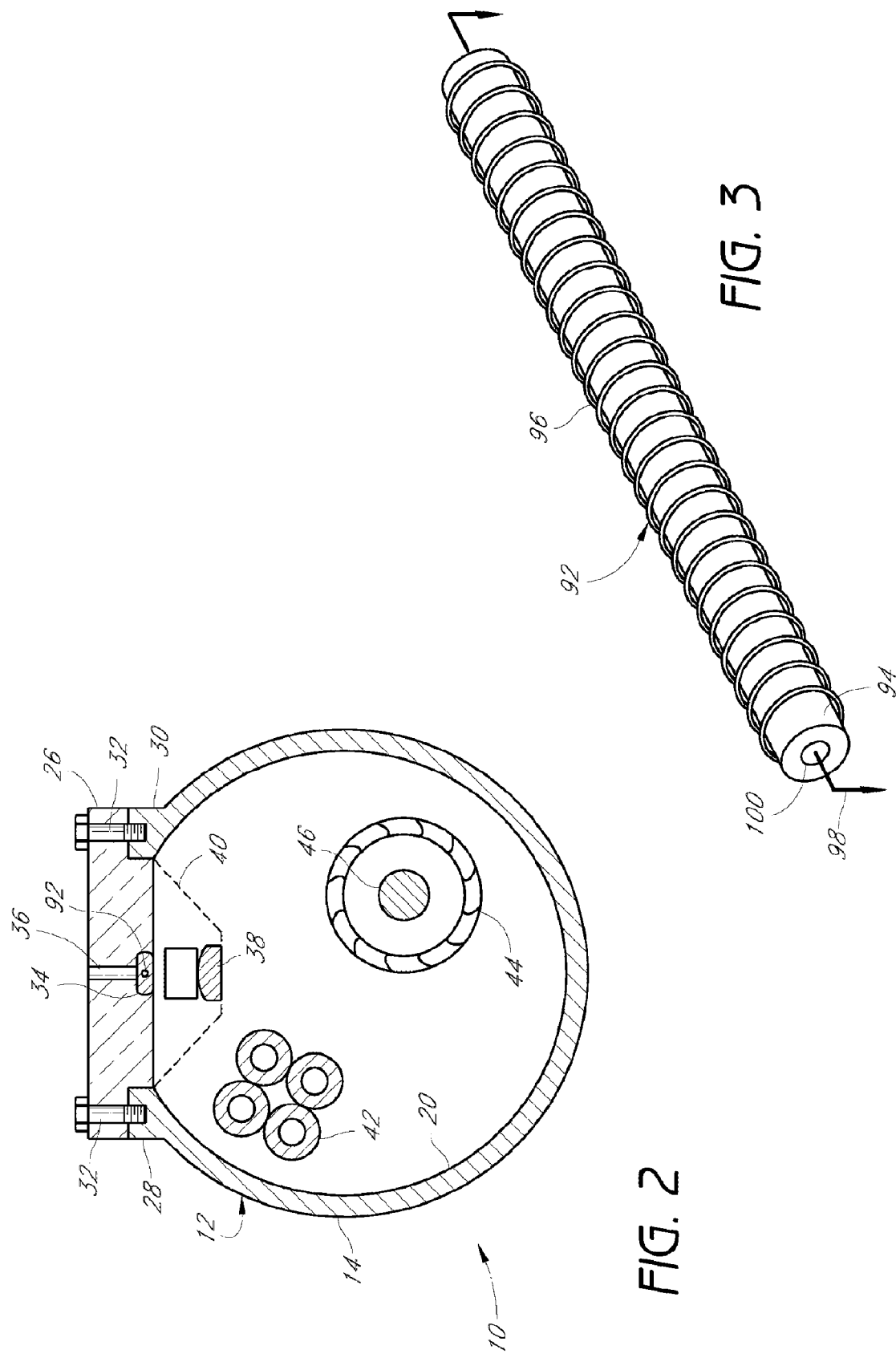

RARE GAS-HALOGEN EXCIMER LASERS WITH BAFFLES

BACKGROUND OF THE INVENTION

1. Field of the Invention

The present invention relates to an improvement in rare gas-halogen excimer lasers, and in particular, to an improvement for increasing the operational lifetime, reliability, efficiency, and/or performance of such lasers.

2. Description of the Related Art

An excimer laser uses a rare gas such as krypton, xenon, argon or neon, and a halide gas or a gas containing a halide, for example $F_2$ or HCl, as the !active components. The active components and possibly other gases are contained in a pressure vessel provided with longitudinally extending lasing electrodes for inducing a transverse electrical discharge in the gases. The discharge causes the formation of excited rare gas-halide molecules whose disassociation results in the emission of ultraviolet photons constituting the laser light. The laser further comprises mirrors or reflective surfaces that form an optical cavity that establish an optical resonance condition. The laser gases are circulated between the lasing electrodes by a fan and may be cooled by a heat exchanger, a structure that removes excess heat.

Excimer lasers emit pulses of ultraviolet radiation and have potentially many practical applications in medicine, industry and communications. This potential success has remained to a large extent unfulfilled because of numerous problems that limit the period of time during which excimer lasers will operate without requiring substantial maintenance or experiencing performance difficulties. One of the obstacles to achieving a practical excimer laser is the challenge of obtaining a homogeneous volumetric discharge between the longitudinally extending lasing electrodes. Preferably, the discharge between the electrodes is substantially evenly distributed within the space separating across the electrodes. The intensity of the discharge between the electrodes, however, can be significantly different at different locations. Such inhomogeneous arcing between the electrodes causes the eventual destruction of the electrodes as well as contamination of the laser gases and optics with sputtered electrode material.

In order to overcome this problem, pre-ionization of the gas volume has been provided. Pre-ionization creates a low level electron cloud prior to the laser-exciting electrical discharge. This pre-ionization results in a homogeneous discharge. One type of pre-ionizer uses a non-solid, perforated, metallic longitudinally extending electrode separated from a co-axial ground electrode by an insulator. The pre-ionizer electrodes are co-axially situated within one of the lasing electrodes, which is made of conductive screen or mesh. The voltage applied to the pre-ionizer electrodes creates a plasma around the pre-ionizer electrodes which produces ultraviolet radiation. The ultraviolet radiation passes through the screen of the surrounding longitudinal lasing electrode to the area between the lasing electrodes and ionizes a portion of the gas there, allowing for a homogeneous discharge when an electric pulse is applied to the lasing electrodes. These additional components within the laser cavity, however, may be potential sources of contamination of the laser gases. Contamination of the laser gases during the operation of an excimer laser may quench the laser action as described more fully below.

Another difficulty with conventional excimer lasers is that contamination of the laser gases or the optics in the pressure vessel necessitates that major maintenance and/or disassembly of the laser be frequently undertaken such as, for example, in the case where the windows need to be replaced. Currently, the operational lifetime of excimer lasers is on the order of about a few tens of millions of pulses per window change. At typical pulse rates of between about 10 and 500 pulses per second, the operating time between such maintenance procedures or disassembly is on the order of hours, rendering such excimer lasers impractical for many, if not most, applications. In addition, because the toxic and corrosive gases used in excimer lasers must be carefully handled during disassembly of the laser and subsequent reassembly, such procedures are complicated and potentially hazardous.

What is needed therefore are laser designs and methods that reduce contamination.

SUMMARY OF THE INVENTION

One aspect of the invention comprises an excimer laser comprising a chamber for containing laser gases, a pair of electrodes, and an optical resonant cavity. The pair of electrodes energizes the gases in a region between the electrodes so as to produce light emission from the gases. The optical resonant cavity comprises a plurality of mirrors that produce a laser beam from the light emitted from the gases, the laser beam propagating in the chamber. The laser further comprises a window on the chamber for egress of the laser beam from the chamber and a fan for circulating the laser gases in the chamber. The laser additionally comprises a baffle comprising an elongated hollow member within the chamber proximal to the window. The elongate hollow member has a hollow passageway for passage of the laser beam. The elongated hollow member also has a proximal opening and a distal opening. The passageway extends from the proximal opening to the distal opening. The elongate hollow member is disposed within the chamber such that the laser beam enters the proximal opening, propagates through the hollow passageway, and exits the distal opening and through the window. The baffle reduces contamination of the window. Preferably, a substantially greater flow of the laser gases flows around the baffle than through the hollow passageway in the elongated hollow member.

Another aspect of the invention comprises an excimer laser comprising a chamber for containing laser gases, a pair of electrodes, and an optical resonant cavity. The pair of electrodes produces an electronic discharge. The electrodes are disposed with respect to each other in the chamber so as to form an active region therebetween. Light is emitted from the active region when a voltage is applied to the electrodes. The active region coincides with at least a portion of the optical resonant cavity. The light emitted from the active region resonating within the optical resonant cavity forms a laser beam. The laser further comprises a window on the chamber for egress of the laser beam from the chamber. The laser beam propagates through a portion of the window coincident with the laser beam. A fan circulates the laser gases in the chamber and through the active region. A baffle restricts the flow of gas across the portion of the window coincident with the laser beam.

Another aspect of the invention comprises a method of extending the lifetime of an excimer laser. This laser comprises a pressure vessel for containing laser gases, an active region for producing a laser beam in the pressure vessel, and at least one optical surface in the pressure vessel, a portion of which is coincident with the laser beam. The method comprises reducing the rate of flow of laser gases across the portion of the optical surface coincident with the laser beam to reduce formation of contaminants on the portion of the optical surface coincident with the laser beam.

Another aspect of the invention comprises an excimer laser comprising a pressure vessel of the type in which a halogen gas is contained, first and second electrodes, first and second reflective elements, and a fan for circulating the gases. The first and second electrodes create a laser discharge between the electrodes. The first and second reflective elements form a laser cavity in the pressure vessel. The laser discharge produces a laser beam in the laser cavity. The first and second optical surfaces are oppositely situated in the pressure vessel. The laser beam propagates between these first and second optical surfaces. The excimer laser further comprises flow control surfaces within the pressure vessel to direct the flow of gases circulating within the pressure vessel away from portions of the optical surfaces on which the laser beam is incident such that the rate at which particulates are deposited on such surfaces where the laser beam is incident is substantially reduced. The portions of the pressure vessel, first and second electrodes, fan, and flow control surfaces that are in contact with the halogen gas are fabricated substantially of materials that react with the halogen gas to form stable reaction products having vapor pressures of less than about $10^{-6}$ torr, at normal operating temperatures, such that the lifetime of the excimer laser is increased by not adding or creating any substantial quantity of laser contamination. Contamination is therefore substantially reduced.

Another aspect of the invention comprises an excimer laser comprising a pressure vessel for containing a halogen gas, first and second electrodes, first and second optical elements, and first and second flow-redirecting surfaces. The first and second electrodes are located within the pressure vessel. The first and second electrodes are separated such that a voltage applied between the first and second electrodes produces a gas discharge that emits light. The first and second optical elements are located at opposite ends of the pressure vessel. The first and second optical elements are disposed with respect to the separation between the first and second electrodes to receive the emitted light. The first and second flow-redirecting surfaces are located adjacent to the first and second optical elements, respectively. The flow-redirecting surfaces reduce the rate at which gases in the pressure vessel flow adjacent the optical component where the optical component receives the emitted light. These flow-redirecting surfaces may comprise baffles at optical windows on the pressure vessel.

BRIEF DESCRIPTION OF THE DRAWINGS

FIG. 2 is a schematic, cross-sectional view of the excimer laser shown in FIG. 1, taken along the lines 2-2 of FIG. 1.

FIG. 3 is a perspective view of a preferred embodiment of a pre-ionizer that can be used in the excimer laser of FIG. 1.

DETAILED DESCRIPTION OF THE PREFERRED EMBODIMENT

The following description of a preferred embodiment of the present invention is presented for purposes of illustration, and should not be taken in a limiting sense.

Figure 1:
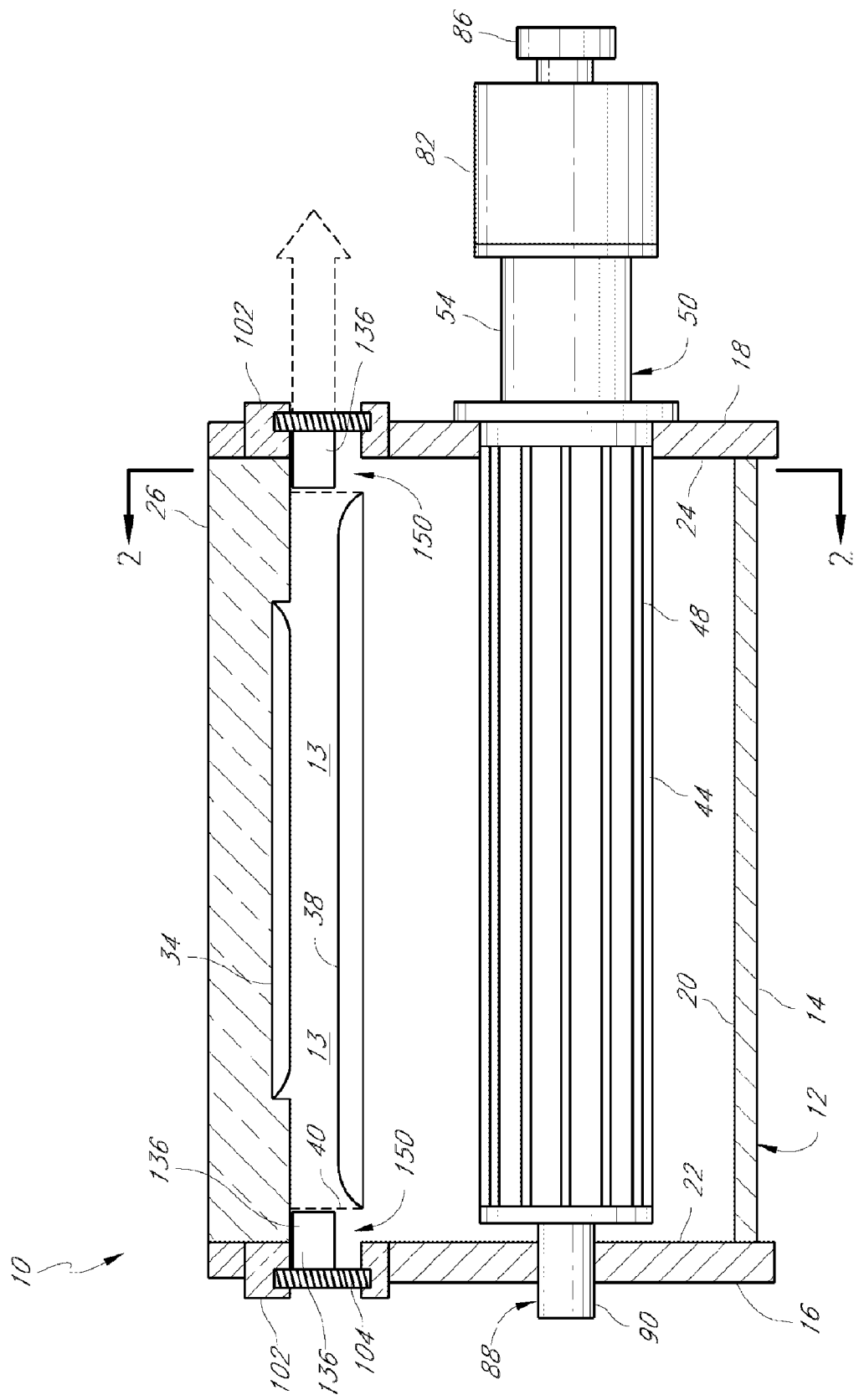
FIG. 1 is a schematic, lengthwise sectional view of an excimer laser according to a preferred embodiment of the present invention.

Cross-sectional views of an exemplary excimer laser 10 is shown in FIGS. 1 and 2. The excimer laser 10 comprises a pressure vessel 12 for containing rare gas and halide gas or gas containing halide. The laser 10 is equipped with electrodes 34, 38 for exciting a discharge in a region 13 between oppositely facing surfaces of the electrodes. This region 13 is referred to herein as the active region of the laser 10. The laser 10 includes reflective optics that form a laser cavity encompassing at least a portion of the active region 13. These reflective optics may comprise a pair of mirrored or substantially reflective optical elements. One of these reflective optical elements is at least partially transmissive for egress of the light beam from the laser cavity to provide laser output. Light generated within the active region 13 is reflected between the mirrors. A resonant cavity formed by the reflective optics enables laser action. The reflective optics may be within the pressure vessel 12, however, in preferred embodiments, the reflective surfaces are outside the pressure vessel. Light passes through windows that are substantially transmissive to the wavelength of light emitted by the disassociating molecules. The laser 10 further comprises a fan 44 for circulating gas, for example, through the active region 13 between the electrodes 34, 38 where discharge is induced. The laser 10 also preferably includes a heat exchanger 42 (see FIG. 2) or structure for dissipating heat.

Contamination in excimer lasers arises from hydrocarbons, water vapor, fluorocarbons and other organic molecules and impurities. The sources of such contaminants are many and varied. For example, the use of plastic supports for the longitudinal electrodes or as electrical insulators in the pressure vessel permits hydrocarbons and other molecules therein to contaminate the laser gases. Many parts in conventional excimer lasers are either made of TEFLON or have a TEFLON coating on them or are manufactured with epoxy resins, polyvinyl chloride, or other plastic materials. TEFLON is perhaps the safest of such materials because TEFLON is relatively inert to the corrosive effects of halogens while also being an electrical insulator. However, TEFLON and other plastic materials contaminate the excimer laser gases by virtue of the presence of hydrocarbon and/or fluorocarbon molecular structures. In addition to quenching the laser action, fluorocarbon or hydrocarbon molecular structures may be dissociated by ultraviolet radiation emitted from the gas discharge, causing carbon or hydrocarbons to be deposited on the laser optics, which eventually destroys the laser output.

Another source of contamination arises from the fan 44 within the pressure vessel 12 to circulate the laser gases. In particular, fluorocarbon grease or other lubricant used in connection with the bearings upon which a shaft 46 of the fan rotates may be a menacing source of contaminants.

Additional problems may arise from water vapor introduced into the pressure vessel 12. The halide gas in the laser system 10 forms inherent metallic halides on the electrode surfaces. Water vapor from the air may gain entry into the pressure vessel 12 as a result of maintenance procedures performed to address contamination of the laser gases or degradation of the optics. The metallic halides in the pressure vessel 12 react with the water vapor to form highly corrosive compositions. For example, nickel fluoride and nickel chloride react with water vapor to form hydrofluoric acid and hydrochloric acid, respectively, which are corrosive substances that seriously degrade the materials used for the optical windows of the pressure vessel, such as for example, quartz, calcium fluoride or magnesium fluoride.

Contamination within the pressure vessel 12, whether it is contamination of the laser gases which tends to quench the laser action or it is contamination of the optical windows on the pressure vessel, results in unreasonably short operating times between maintenance procedures. These maintenance procedures, which may involve changing the gases in the pressure vessel 12 and cleaning and/or replacing the optical and other components in the pressure vessel are time consuming and costly. During the period that such corrective procedures are being performed, the excimer laser 10 is not available for use. In addition, the halogen gases used in excimer lasers and other gases that might be formed from impurities are highly toxic. When such gases are handled, such as during maintenance procedures, the possibility of their escape into the surrounding atmosphere poses a safety hazard. The safety hazard is particularly troublesome when the excimer laser 10 is utilized for medical procedures and is being serviced proximate to where such medical treatment is provided.

Such contaminants, if situated in the path of the laser energy beam, may interfere with the propagation of the beam and reduce the amount of energy that is output by the laser. This situation is exacerbated in the case where such contaminants deposit in more significant amounts and at faster rates on surfaces where the laser energy beam impinges in comparison to other locations in the pressure vessel, for example, on other surfaces within the pressure vessel.

Even in the case where preferred materials such as nickel and alumina are employed within the pressure vessel 12 as disclosed in U.S. Pat. No. 4,891,818, which is incorporated herein by reference in its entirety, some halide compounds will ineluctably be formed. A typical by-product of laser operation may be nickel chloride or nickel fluoride, which appears as a white film, or dust, when deposited on the internal surfaces of the pressure vessel 12. The formation of such halide compounds may be from the electron and ion bombardment caused by action of the electrodes. The nickel chloride or nickel fluoride will be generated initially by the plasma, due to the intense energies involved. The nickel chloride and nickel fluoride will have some electrical affinity. In general, the NiCl or NiF dust may preferentially deposit on the illuminated surface of the windows, i.e. where the laser beam is incident. This enhanced deposition of particulates is possibly due to electric charges formed on the window surface that creates an electrical affinity for the dust particles which are also charged. Alternatively, this preferential deposition may possibly be due to a form of photo-deposition caused by the laser beam. Other causes or explanations are possible. Regardless of the scientific reasons, such preferential deposition on the illuminated surfaces of the windows is a leading factor necessitating maintenance procedures on the pressure vessel 12, notwithstanding the high purity of suitably compatible materials utilized within the pressure vessel.

As discussed above, the excimer laser 10 shown in FIGS. 1 and 2 includes the pressure vessel 12 for containing the laser gases and various components of the excimer laser. In this embodiment of the invention, the pressure vessel 12 is formed of a partially cylindrical longitudinal member 14 to which are attached first and second end plates 16 and 18. The longitudinal member 14 and the end plates 16 and 18 are preferably nickel-plated on their inside surfaces, i.e. surface 20 of longitudinal member 14 and surfaces 22 and 24 of the respective first and second end plates 16 and 18. The end plates 16 and 18 are attached to the longitudinal member 14 in a manner that preferably allows only nickel portions or nickel-plated portions of the end plates 16 and 18 and the member 14 to be exposed to the inside of the pressure vessel 12. Suitable openings and feed-throughs for various uses are provided in end plates 16 and 18.

A ceramic cap member 26 formed of high-purity alumina ($Al_2O_3$) is secured by bolts 32 (see FIG. 2) to flanges 28 and 30 provided along the longitudinal edges of longitudinal member 14, to complete the pressure vessel 12. These components, including the partially cylindrical longitudinal member 14, end plates 16 and 18 and the ceramic cap member 26 are configured and fitted together so that the pressure vessel 12 forms a container capable of safely holding the gases in the excimer laser 10, which may be at a pressure between one and five atmospheres.

As mentioned above, a rare gas and a halide gas or a gas containing a halide are utilized by the excimer laser 10. In addition, other gases, e.g. helium, may also be included in an excimer laser 10. The various openings and feed-throughs in the end plates 16 and 18 and the ceramic cap member 26 are configured in such a manner that the requisite pressures can be maintained within the pressure vessel 12, with an adequate, applicable margin of safety that the laser 10 will not leak and the gases will not escape the pressure vessel. While the pressure vessel 12 may assume various configurations, the laser gases in the pressure vessel 12 are preferably exposed virtually only to preferred materials such as high-purity nickel and high-purity alumina. High purity materials may include insubstantial quantities of halogen reactive elements, compounds, or materials that could have significant vapor pressure under the condition of use. The halogen gas reacts with these high purity materials at a sufficiently slow rate and produces stable passivation layers, such as NiCl and NiF, that themselves are inert to the halogen gas. Minimal contamination of the laser gases therefore arises.

Alternative materials to the preferred high-purity nickel and high-purity alumina include any materials that react with a halogen gas to produce reaction products that are stable (i.e. do not flake off) and that have a low vapor pressure under normal operating conditions. These vapor pressures are sufficiently low such that the resulting partial pressures of any constituent contaminants does not impair the performance of the laser in any manner, when operating at normal operating temperatures, e.g., about 20-30 degrees C. for a time period of months. For example, this vapor pressure is preferably less than $10^{-6}$ torr. In contrast, the output of conventional excimer lasers will decay in less than a week without special care. Silver and gold are alternative materials to nickel, but these materials possess weaker mechanical strength and are more expensive. In addition, in the case of gold, water vapor in the vessel 12 is highly reactive with gold when exposed to HCl. Accordingly, preferably such water vapor is reduced or eliminated if gold is employed. Electrically-conductive materials conventionally employed within the pressure vessel 12 of excimer lasers, include stainless steel, aluminum, molybdenum, tantalum and tungsten. Non-electrically conductive materials that have been commonly used within the pressure vessel 12 of excimer lasers include silicon, carbon, Teflon, Kynar, epoxy and various ceramics. Such materials pose a heightened risk of contaminating the laser 10.

In the embodiment depicted in FIGS. 1 and 2, the ceramic cap member 26 serves as a support for a first laser discharge electrode 34 and insulates the first discharge electrode 34 from the longitudinal member 14 of the pressure vessel 12, which is preferably grounded. Feedthroughs 36 are provided in the ceramic cap member 26, to electrically connect a high voltage power source external to pressure vessel 12 to the first laser discharge electrode 34. The first discharge electrode 34 preferably comprises a metal mesh or screen for use with a pre-ionizer structure 92, as discussed more fully below. The second laser discharge electrode 38 is preferably supported in pressure vessel 12 by an alumina ceramic spacer (not shown) so as to be separated from the first discharge electrode 34. The space 13 between first and second laser discharge electrodes 34 and 38 defines the area 13 in the pressure vessel 12 where lasing action occurs. As discussed above, this region 13 is referred to herein as the active region. The second laser discharge electrode 38 is grounded to the pressure vessel 12 through a conductive current return screen 40. The first and second laser discharge electrodes 34 and 38 and the current return screen 40 may be of conventional configuration. Other configurations are possible as well.

The laser gases used in the excimer laser 10 may be the same as has been previously used in excimer lasers, although other gases and combinations of gases can be used. In the embodiment shown in FIG. 1, a heat exchanger 42 is provided in the pressure vessel 12, since the gases of an excimer laser become heated during the lasing action. In various embodiments, the heat exchanger 42 extends along the length of the pressure vessel 12, however, for simplicity, the heat exchanger 42 is omitted from FIG. 1. The surface of the portions of the heat exchanger 42 in contact with the laser gases in the pressure vessel 12 are preferably formed of nickel. The heat exchanger 42 may be of conventional design and configuration, however, the heat exchanger should not be so limited. Other structures such as the wall of the pressure vessel 12 may also be employed to dissipate heat and thus operate as the heat exchanger 42.

The laser gases are circulated through the pressure vessel 12 by a tangential fan 44 supported by a fan shaft 46. The portions of the tangential fan 44 and fan shaft 46 in contact with the laser gases preferably comprise compatable material such as high-purity nickel or high-purity alumina. In FIGS. 1 and 2, the blades 48 of the tangential fan 44 are located around the shaft 46. Unlike conventional tangential fans, however, the tangential fan 44 is preferably provided with bearings and a drive mechanism for the fan shaft 46 that are isolated from the laser gases in the pressure vessel 12 and therefore cannot contaminate the gases. For example, these bearings and drive mechanism are described in U.S. Pat. No. 4,891,818 referred to above and, which is incorporated herein in its entirety. Other configurations and designs and other arrangements for circulating the gas are also possible.

The structure of the pre-ionizer is shown in FIG. 3. In this embodiment, the corona pre-ionizer 92 comprises a tubular ceramic insulator 94 that extends the length of the first laser discharge electrode 34. Preferably, the tubular ceramic insulator 94 comprises suitable materials such as high-purity alumina. A helical wire 96 wrapped about the tubular ceramic insulator 94 serves as a high voltage electrode for the pre-ionizer 92. The wire 98 along the bore 100 of the tubular ceramic insulator 94 is the ground electrode. The corona pre-ionizer 92 need not use a ceramic insulator having this shape. Other shapes of ceramic insulators may be used, e.g. a flat disk or square tube. Similarly, perforated electrodes rather than a helical wire may be used. Other configurations and designs may also be employed in the alternative.

As discussed above, the laser 10 is preferably designed to reduce the sources of contamination of the laser gases and the optical surfaces within the pressure vessel 12. Additionally, the laser 10 also preferably includes window assemblies 102 for supporting optical windows 104, shown in FIGS. 4 and 5, with a laser beam 105 passing therethrough. The window assemblies are preferably designed to improve reliability by requiring fewer replacements of the windows 104. The removal and replacement of the optical windows 104 after these elements have degraded as a result of contamination involves toxic laser gases to be handled. In particular, the toxic gases are removed from the laser cavity and subsequently replaced after repair has been completed. In various embodiments, the window assembly 102 for holding an optical window 104 at each end of the laser cavity preferably provides the capability of rotating or translating the optical window so that different portions of the window are illuminated by the laser beam 105. This beam 105 is produced in the pressure vessel 12 between the first and second laser discharge electrodes 34 and 38. Accordingly, a clean optical surface can be provided without removing the window 104 and consequently without withdrawing the laser gases from the pressure vessel 12 and subsequently refilling the vessel with the toxic gases.

Figure 5:
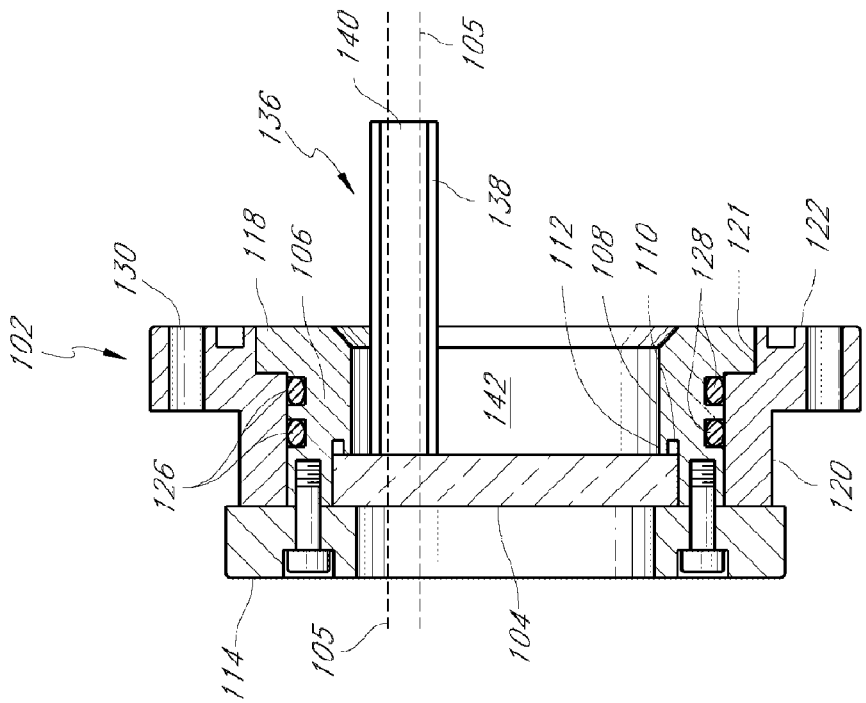
FIG. 5 is a cross-sectional view of the preferred embodiment of the window assembly shown in FIG. 4, taken along the lines 5-5 in FIG. 4.
Figure 4:
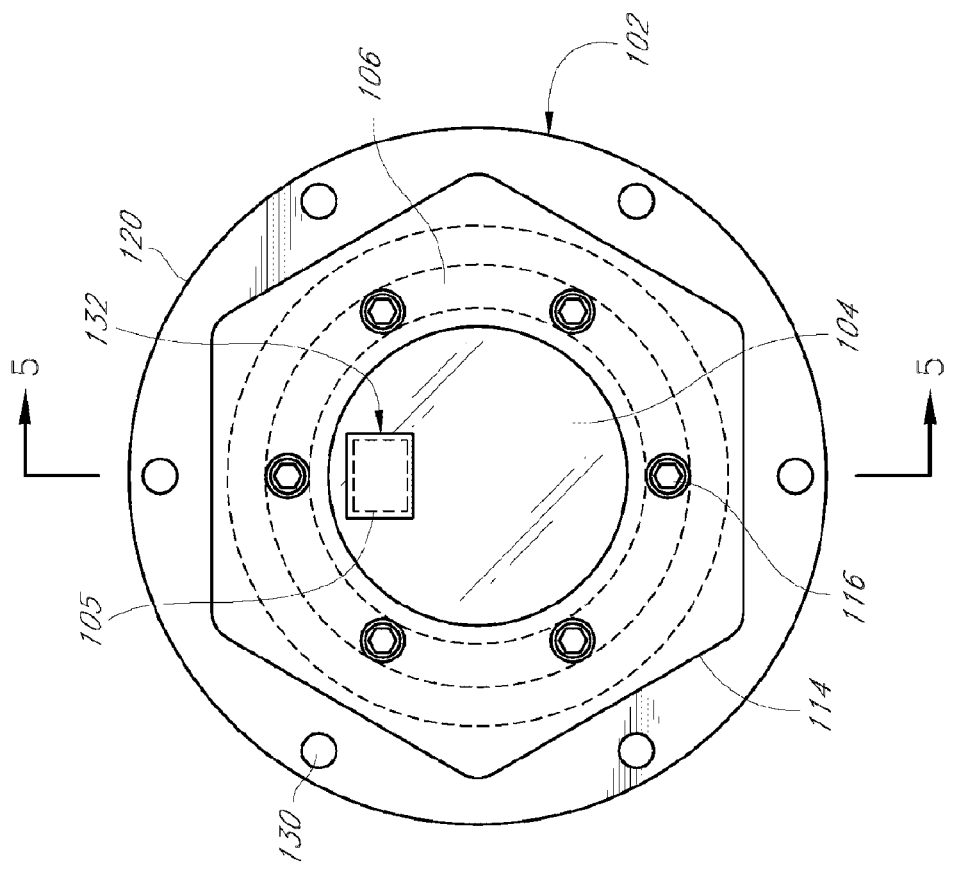
FIG. 4 is a plan view of a preferred embodiment of a window assembly for the excimer laser of FIG. 1.

One embodiment of the window assembly 102 is further described with continued reference to FIGS. 4 and 5. The optical component 104 in this window assembly 102 is rotatable so as to move different portions of the optical component into the path of the laser beam 105. An annular sleeve 106 having an interior shoulder 108 is provided for mounting the optical component 104. The optical component 104 and the interior diameters of the sleeve 106 above and below the shoulder 108 are sized so that the optical component 104 fits in the sleeve and abuts an O-ring 110 disposed in a groove 112 in the shoulder 108. Lateral movement of the optical component 104 is restricted by the sleeve 106. An annular ring 114 with a hexagonal periphery is secured over the peripheral edge of the optical component 104 by bolts 116, so that the optical component 104 is securely held between the shoulder 108 of the sleeve 106 and the annular ring 114. Each optical component 104 is oversized, having an area sufficient to accommodate several non-overlapping cross-sections of the laser beam 105. Completely different portions of the optical component 104 may therefore be successively interposed into the path of the laser beam 105. Other configurations are also possible.

The annular sleeve 106 includes a flange 118 for holding a window mount 120 between the sleeve 106 and the annular ring 114. The window mount 120 is of annular configuration and has a circumferential notch 121 along its inside, at the beginning of a mounting flange 122, that accommodates the flange 118 of the sleeve 106. In addition, the inside cylindrical surface of the window mount 120 is sized to slide over the outside surface of the sleeve 106 and to seal against it using, e.g., o-rings 126 formed of a halogen compatible compound or material having only a very small surface area that is exposed to the halogen gas. The window mount 120 is slipped over the sleeve 106 prior to securing the annular ring 114 by bolts 116 to the annular sleeve 106. The window mount 120 and the secured sleeve 106 and the ring 114 holding optical component 104 are thereby rotatably secured together, the o-rings 126 allowing rotation while at the same time providing sealing. Bolts through bores 130 in the mounting flange 122 on the window mount 120 are used to secure/affix each window assembly 102 to an end plate 22 or 24 over an opening therein. Thus, a portion 132 of the optical component 104, preferably not including the center portion, is exposed to the laser beam 105.

The portion 132 of the optical component 104 exposed to the laser beam 105 may be changed by rotating the annular ring 114 by its hexagonal periphery. The optical component 104 will rotate with the annular ring 114. Many other configurations and arrangements may be used in order to provide an optical component 104 for each end of an excimer laser 10 that is rotatable so as to place a different portion of the optical component into the path of the beam 105 without the necessity for removing the optical component. Other configurations that provide translation may also be advantageously employed as well as configurations that do not facilitate rotation or translation of the windows.

In one preferred embodiment, the window assemblies 102 are used in conjunction with external mirrors (not shown in the drawings) that define the laser cavity. The windows 104 are transmissive so that the generated laser beam can escape the cavity. The external mirrors could be eliminated by appropriately coating the optical components 104 of the window assemblies 102 so as to make one of them substantially reflective and the other partially reflective and at least partially transmissive. The portions of the window assemblies 102 that are in contact with the laser gases, with the exception of the optical components 104, are preferably formed entirely of a compatible metal such as high-purity nickel or ceramic such as high-purity alumina. Preferably, all of the remaining portions of other components of the excimer laser 10 that are exposed to the laser gases are likewise formed of similar compatible materials.

Consequently, reaction of the halogen gas that produces contaminants is reduced. Less contamination of the gases and of the optical components 104 therefore occurs. The optical components 104 exposed to the gases are preferably formed of highly polished quartz ($SiO_2$), $CaF_2$, or $MgF_2$ although other material may possibly be used. Preferably, the windows 104 are also isolated from any electron or other ion bombardment and are removed from any high-voltage stress. The windows 104 are therefore preferably separated from the active region 13 of the laser 10 as depicted in FIG. 1. The window material in such cases is preferably substantially inert.

To further reduce contamination on the windows 104, the laser gases are preferably diverted from the surfaces of the windows. As discussed above, contamination preferentially deposits or for other reasons appears in increased density on surfaces of the windows 104 exposed to the laser beam 105. Such contamination may take form of particulates such as white powder. Accordingly, the laser 10 is configured such that gas flow is reduced proximate to portions of the window 104 through which the laser beam 105 passes. Baffles and other gas flow control surfaces, for example, preferably shroud the laser beam 105 in regions nearby the surface of the window, cover the windows, or both. Baffles or other gas flow control surfaces can also be arranged to guide the flow of the laser gases through the active region 13 so as to generate laser light yet may be configured to direct the gases away from the window surfaces or that otherwise inhibit the flow of gas to the windows.

As shown in FIG. 1, each window assembly 102 is separated from the active lasing region 13 by a space 150. Preferably, the space 150 separating the window 104 and the active lasing region 13 is a few inches, e.g., 1-5 inches. In the embodiment illustrated in FIG. 1, a hollow tubular section 136 is disposed within the space 150 between the active lasing region 13 and the windows 104.

The hollow tubular section 136 extends longitudinally a length, 1, along a direction, z, referred to herein as the longitudinal direction. Preferably the length, 1, is sufficiently long to extend through the space 150 separating the window 104 and the active lasing region 13. Preferably, however, the length is not so long such that the tube 136 extends substantially into lasing region 13. According, the length, 1, may be between about 1 to 5 inches in some embodiments. Lengths outside this range may also be employed. For example, where the space 150 separating the window 104 and the lasing region 13 is larger or smaller or the tube 136 extends into the lasing region, the tube length may be larger or smaller.

As shown in FIG. 5, the hollow tubular section 136 has walls 138 that surround an open area 140 within the tube. In some embodiments, the hollow tubular section 136 may have a conventional geometry corresponding, for example, to a right circular cylinder. The hollow tubular section 136 may have an inner diameter and an outer diameter that define the thickness of the walls 138. Cross-sections along planes perpendicular to the longitudinal axis of the tube 136 will correspond to annular sections in such cases. Other cylindrical shapes, however, are possible. In other embodiments, such as shown in FIG. 4, for example, the tube 136 may be substantially rectilinear, having rectangular or square cross-sections rather than circular cross-sections transverse to the longitudinal axis. Still hollow elongated channels having other shapes may be employed. The tube 136 may also have corrugated or other irregularly shaped surfaces in some embodiments and need not be completely straight along the longitudinal direction. Optical elements, such as reflective optical elements, lens, or other optical components may be included in the tube 136. The baffle, shown here as a tube 136, may have features, such as size (e.g., width), shape, and thickness, that vary along the longitudinal direction. Accordingly, the baffle may take other forms than the cylindrical tube 136 shown in FIG. 5. For example, funnel shaped structures such as described more fully below, may be suitable for certain designs.

In the embodiment depicted in FIG. 1, however, the baffling comprise the cylindrical tube 136 that is substantially straight. Moreover, the hollow tubular section 136 is oriented such that the longitudinal axis of the tube is parallel to the longitudinal axis of the pressure vessel 12. The longitudinal axis of the tube 136 is also parallel to the optical path of the laser beam 105 propagating though the region 150 between the active region 13 and the window 104. More preferably, the hollow tubular section 136 is collinear with the laser beam 105 and has an inner diameter or hollow cross-section sufficiently wide to encompass the laser beam. In various preferred embodiments, the inner diameter or hollow cross-section is not substantially larger than that cross-section of the beam 105 such that the laser beam substantially fills the cross-section of the tube 136. Preferably, the internal dimension (e.g., diameter) of the tube is matched to the beam size. For example, the inside diameter or width of the tube is preferably just slightly larger than the beam's cross-sectional dimension in some embodiments. The cross-sectional width of the beam may be measured by the 1/e point where the intensity falls off to 1/e of the maximum value, e.g., at the center of the beam. The size of the tube, however, may be outside these ranges in certain embodiments.

Where a rotating window assembly 102 such as described above is employed, the longitudinal axis of the laser beam 105 is preferably aligned off-center with respect to the center of the window 104. The longitudinal axis of the laser beam 105 intersects the illuminated regions of the window 104 where the beam passes therethrough. In such cases, the tube 136 is preferably offset accordingly to substantially shroud the section of the laser beam 105 between the active region 13 and the window 104 from the laser gases.

FIG. 5 shows a closer view of the tube 136 positioned within the pressure vessel adjacent the window assembly 102. As shown, the inner cross-section of the tube 136 is greater than, and encompasses, the diameter of the laser beam 105. The tube 136 may abut the window 104 and preferably surrounds the portion of the window 140 where the laser beam 105 is incident thereon. The tube 136 is secured in place for example by attaching the tubular section to the pressure vessel 12 or other components therein via a mechanical attachment such as a threaded attachment, screw, bolt, or other fastener or connector. The tube 136 extends into a large recess 142 formed in sleeve 106 and extends for a few inches beyond sleeve 106, and into the pressure vessel 12.

Preferably, the tube 136 comprises any suitable compatible materials (for example nickel or alumina ceramic); the tube may comprise entirely of such compatible materials or may be coated with such materials. Preferably, at least the surfaces exposed to the laser gases comprise compatible material discussed above such as nickel or alumina ceramic. Such tubing is available from Coors Ceramic, of Boulder, Colo.

The laser beam 105 thus is propagated through a tube 136 and passed through the window 104, and to the external mirror (not shown). The laser beam 105 is reflected back through the tube 136 and travels through the active region 13 entering the tube on the opposite side. The laser beam 105 continues through the other window and is incident on the other mirror (not shown) located on the opposite side of the chamber 12. A portion of the laser energy is preferably coupled out of the optical cavity by the partially transmissive mirror.

The fan 44 provides a flow of gas across the active region 13 of the laser. The gases flow in a direction perpendicular to the longitudinal axis of the vessel 12 and the laser beam 105. When the circulating gases encounter a tube 136, the gases are diverted around the tube. Preferably, the laser 10 is configured such that the gases are not induced to flow into tube 136. The design of the fan 44, its orientation and flow directions as well as blades 48 or fins thereon and the size, orientation, and positioning of the tube 136 may be selected such that gas flow into the tube is reduced. Accordingly, portions of the laser beam 105 within the tube 136 and proximal the window 104 encounter less flowing gas than portions of the laser outside the tube, e.g., within the active region 13 of the laser 10. Gas flow within the active region 13 of the laser 10 is desirable to facilitate lasing. As discussed above, however, gas flow proximal the window 104 is preferably reduced especially where the laser beam 105 is incident thereon.

The degradation of the windows 104 used in excimer lasers 10 from contamination occurs mainly where the beam 105 impinges upon the window 104 and may be primarily due to photodecomposition and photoactivated surface attachment of hydrocarbons or fluorocarbons such as for example carbon tetrachloride $CCl_4$. Photodecomposition of carbon tetrachloride, for example, produces carbon. Such contamination introduces optical loss.

Each tube 136 serves to restrict the flow of gases comprising the halide reacted compound particulates from the active surfaces of the windows 104. The baffle preferably prevents or at least reduces the amount of such particulates and contamination that reach the window. The baffle also preferably protects the window from gases that will react to produce contamination on the window. In the embodiment shown in FIGS. 1 and 2, for example, the tubes 136 screen the laser beam 105 from the gases in the regions proximal to the windows 104 or laser optics. The structure channels the flow of a fluid along desired paths by impeding the flow of the fluid from other undesirable routes. Accordingly, the tubes 136 are referred to as a baffle.

In various preferred embodiments, the tube 136 may extend into the vessel 12 to the border of the active region 13 where lasing occurs, so as to further restrict the access of the gases to the window 104. The longer the tube 136, other variables being equal, the slower the rate at which gases are exchanged within the tube. Smaller tube cross-sections decrease the area through which gases are conducted, for example, in a circularly cylindrical tube the inner cross-sectional area is $$\frac{\pi(d_{inner})^2}{4}$$

where $d_{inner}$ is the inner diameter of the tube. Decreasing the exchange rate reduces the rate of flow of gases over the portions of the window surface through which the laser light passes.

In the embodiment depicted in FIG. 5, the window 104 is recessed as the window is disposed at one end of the sleeve. The baffle is inserted within the sleeve to reduce the flow of gases within the sleeve in the proximity of the laser beam, and particularly where the laser beam is incident on the window. The sleeve has an open region therein through which the laser gases can readily access the window. The tube within this region in the sleeve restricts the flow of such gases circulating in the sleeve. The flow of gases in the tube is preferably substantially less than the flow of gases in the open region of the sleeve, e.g., that are progressing toward the windows.

The baffle shown in the form of a relatively narrow and long tubular section restricts the flow of gases within the sleeve to the window. Preferably, the tube has an inner diameter or lateral cross-section that is less than the length of the tube. The tube depicted in FIG. 5, for example, has an interior cross-sectional dimension that is less than about ½ to 1/20 the length of the tubular section. The tube therefore provides a channel for the light to pass which restricts the flow of gases. This channel preferably has a length that is several times greater than the size or diameter of the lateral cross-section (e.g. area) to preferably provide a high aspect ratio.

The area of the hollow portion of the tube will control in part the flow therethrough. The relationship of the length to area of the channel, along with the shape or geometry, may in part, determine the conductance through the channel. Preferably, the conductance of the tubular section is less than the sleeve and the path from the fan to the active region. Accordingly, the baffling reduces conductance to the illuminated portion of the window.

The result is that the rate at which contaminants such as for example NiCl and carbon are deposited on the surface of the window is markedly reduced at least in the area where the laser light propagates through the window 104. In contrast to conventional laser designs, the deposition rate on these window surfaces coincident with the laser beam 105 does not rapidly exceed the deposition rate on the other portions of the window surfaces exposed to the gases but not to the laser light. By retarding the rate at which such deposits are formed on the surface of the window 104, the average number of pulses which a single window may sustain is increases two to twenty-five-fold.

By reducing the rate of flow of gases that cause contamination of the windows 104 and thus by extending the useful life of the windows, more flexibility in materials selection may be afforded. In particular, the requirement that surfaces within the pressure vessel 12 exposed to the gases comprise select materials of high purity may be at least partially relaxed. In such cases, some incompatible material can be employed in the container.

Figure 6:
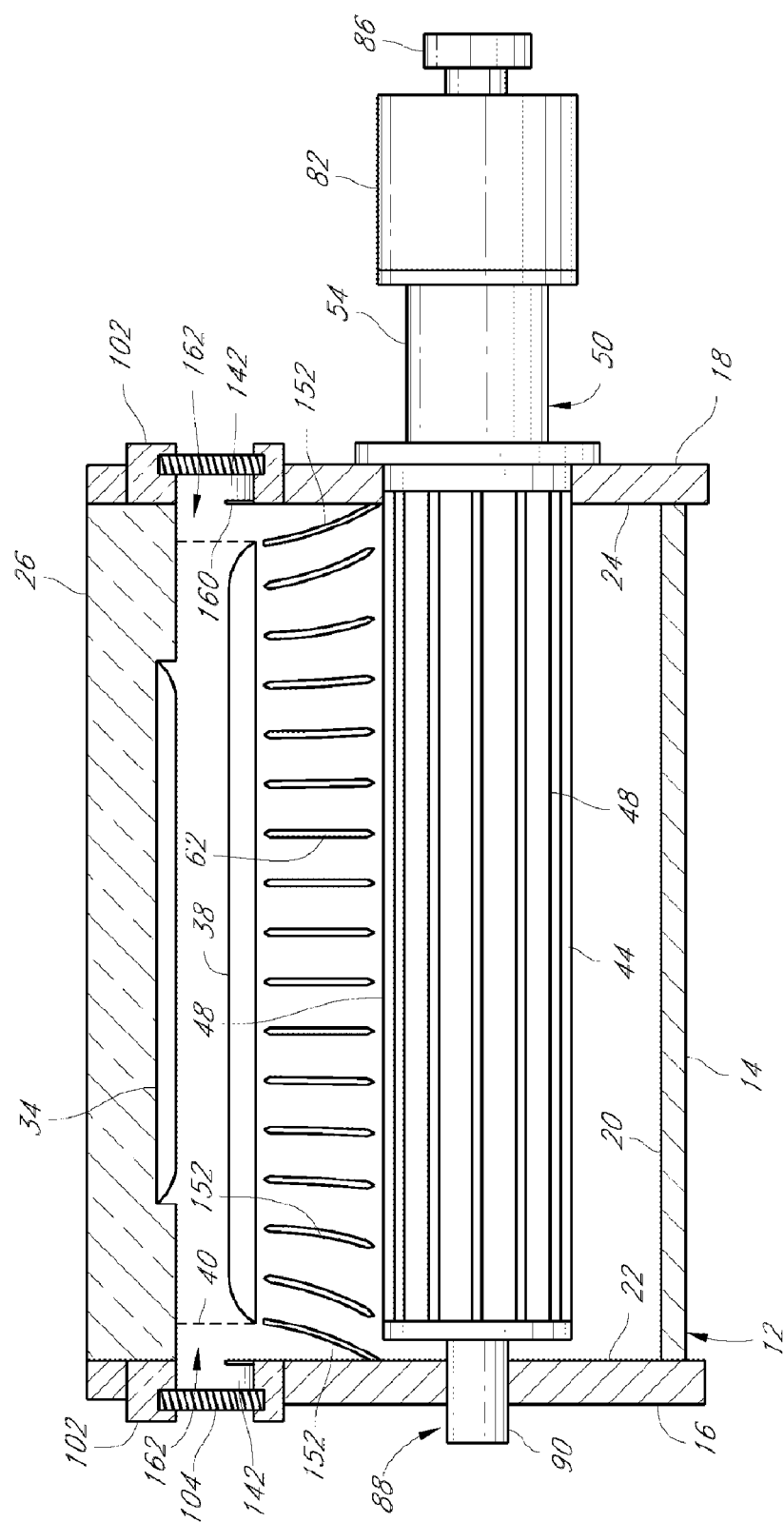
FIG. 6 is a schematic, lengthwise sectional view of a preferred embodiment of an excimer laser having flow control surface for directing gases away from optical components in the laser.

As illustrated in FIG. 6, the baffle need not comprise a tube per se but may comprise control flow surfaces having other configurations that reduce the flow of the gases across the window surface. For example, the baffles shown in FIG. 6 comprise contoured surfaces 152 (e.g., fins or vanes or other flow control structures) that direct the flow of gases circulated by the fan 44 through the active lasing region 13 and away from the windows 104. These contoured surfaces are disposed on a plurality of fins or vanes in the chamber 12. These fins or vanes may form part of the pressure vessel, for example, being contour surfaces on the walls of the vessel or may comprise separate structures, e.g., mounted thereon. The plurality of fins or blades may exchange or dissipate heat contained in the gas. Preferably, these surfaces 152 comprise materials compatible with the gases as described above. In FIG. 6, the blades 48 on the fan 44 are shown as being configured to direct the flow of gases circulated by the fan 44 through the active lasing region 13 and away from the windows 104. Other blade configurations are also possible.

Other design configurations and techniques can be employed to reduce the rate of deposition of contaminants on the surfaces of the windows 104 in the path of the laser beam 104. As described above, control surfaces 152 can be configured to direct the flow of the gases away from the windows 104 and toward the lasing zone 13. Vanes, blades, or fins, on the fan or elsewhere in the pressure vessel 12 as well as ducts, manifolds, nozzles, and the like may control the flow of the gases as desired. The embodiment shown in FIG. 6 also includes the recess 142 in the window assembly 102 which is covered over or shrouded by a plate 160 or other surface. This plate 160 or other surface may have an aperture 162 thereon for passage of the laser beam 105. This aperture 162 is preferably matched to the size of the beam. The plate 160 and aperture 162 preferably establish a conductivity that is smaller than the open region of the sleeve and provides a correspondingly reduced flow rate.

In various other embodiments, a baffle similar to the tubular section 136 described above may be included between the aperture and the window 104 to further isolate the window surface coincident with the laser beam 105 from gases and contamination. In certain other embodiments, a funnel-like baffle may be disposed over the window assembly 102. This funnel may have a larger aperture that is fitted over the window 104 and a smaller aperture closer to the active region 13 of the laser 10. Accordingly, laser light propagating from the active region 13 of the laser 10 will enter the smaller aperture and traverse the length of the funnel exiting through the larger aperture toward the window 104. Preferably the large aperture of the funnel abuts or is sufficiently close to the window 104 to prevent gas from reaching the window surface. A seal between the funnel or other baffle preferably prevents leakage of gas into the region over the surface the window 104. Also, the smaller aperture is preferably matched to the beam size whereas the larger aperture is sufficiently large to accommodate multiple such beam cross-sections.

Although control flow surfaces are illustrated above in connection with protecting window surfaces from contamination, the techniques and designs described herein can also be applied to other optic surfaces as well. For example, baffles can be employed to direct the gases away from mirrors, laser optics, or other optical elements that may be degraded by contamination.

Also, as described above, the control flow surfaces 152 may be employed in a laser 10 in which the only materials that are exposed to the laser gases are those that react with the halogen gas to form stable reaction products having a low vapor pressure of less than about $10^{-6}$ torr, at normal operating temperatures, e.g., about 20-30 degrees C. One suitable metal is high-purity nickel, and one suitable insulator is high-purity alumina ($Al_2O_3$). Use of Teflon and similar halogen-reactive materials is preferably reduced or minimized. For example, the insulating support for the high voltage discharge electrode in the pressure vessel preferably comprises high-purity alumina, rather than Teflon or plastic. Similarly, the corona pre-ionizer preferably includes an alumina insulator between its high voltage and ground electrodes. As explained above, by restricting the access of the laser gases to such materials, contamination resulting from hydrocarbons, fluorocarbons and other organic materials that can quench the laser action or degrade the optics can be substantially reduced or eliminated.

To achieve a further reduction in the frequency of servicing or replacement of the windows 104, oversized windows in rotatable mounts may be employed. Preferably, the windows 104 are mounted so that the laser beam 105 is incident on and propagates through a portion of the window laterally displaced from the center of the rotatable mount. When the portion of the window 104 coincident with the laser beam 105 has degraded to an extent sufficient to introduce substantial loss, the mount may be rotated. Preferably, the window 104 is rotated such that the laser beam 105 is incident on a portion of the window not previously exposed to the beam such that substantial contamination has not been formed thereon. Depending on the relative placements and size of the beam 105 and the size of the rotatable window 104, the duration between servicing of windows can be increased by nearly an order of magnitude. The frequency of disassembly and re-assembly of the excimer laser 10 will be reduced by a similar amount. Although various embodiments have been described herein, other configurations different than those specifically discussed are also possible.

The various techniques and design features discussed above may be employed alone or in various combination to improve the reliability and performance of excimer lasers. These approaches are both inexpensive yet effective in reducing contamination at the location where the laser beam 105 impinges upon the windows 104 or other optical elements in the excimer laser 10. The deposition rate of contamination on the portion of the optical surfaces coincident with the laser beam 105 no longer rapidly exceeds the deposition rate on the optical surfaces not exposed to laser light. Accordingly, less optical loss is introduced by these optical elements 104. By retarding the rate at which such deposits are formed, the number of pulses of laser light to which the elements 104 can be exposed is increased substantially. Similarly, the time between replacement of these components will be extended thereby improving the reliability and performance of the laser 10. Accordingly, the resultant excimer laser 10 may offer a more practical, efficient, and safer light source than currently available. Such lasers may be employed in medical, industrial, and communication applications as well as in other areas.

What is claimed is:

1. An excimer laser comprising:
    a chamber for containing laser gases;
    a pair of electrodes for producing electronic discharge, said electrodes disposed with respect to each other in said chamber to form an active region therebetween, light being emitted from said active region when a voltage is applied to said electrodes;
    an optical resonant cavity, said active region coinciding with at least a portion of said optical resonant cavity, said light emitted from said active region resonating within said optical resonant cavity thereby forming a laser beam;
    a window on said chamber for egress of said laser beam from said chamber, said laser beam propagating through a portion of said window coincident with said laser beam;
    a fan for circulating said laser gases in said chamber and through said active region; and
    a baffle for restricting the flow of gas across said portion of said window coincident with said laser beam,
    wherein said baffle comprises a stop disposed in front of said window, said stop having an aperture for said laser beam to pass.

2. The excimer laser of claim 1, wherein said aperture has a size about equal to the width of said beam at said aperture such that said aperture is substantially matched in size to said laser beam cross-section.

3. The excimer laser of claim 1, wherein said aperture has a size larger than the width of said beam at said aperture.

4. An excimer laser comprising:
    a pressure vessel of the type in which a halogen gas is contained;
    first and second electrodes for creating a laser discharge between the electrodes;
    first and second reflective elements forming a laser cavity in said pressure vessel, said laser discharge producing a laser beam in said laser cavity;
    first and second optical surfaces oppositely situated in said pressure vessel, said laser beam propagating between said first and second optical surfaces;
    a fan for circulating gases within the pressure vessel; and
    flow control surfaces within the pressure vessel to direct a flow of gases circulating within the pressure vessel away from portions of said optical surfaces on which the laser beam is incident, such that the rate at which particulates are deposited on such surfaces where said laser beam is incident is substantially reduced, wherein portions of the pressure vessel, first and second electrodes, fan, and flow control surfaces that are in contact with halogen gas within the pressure vessel are fabricated substantially of materials that react with the halogen gas to form stable reaction products having vapor pressures of less than about $10^{-6}$ Torr at normal operating temperatures, such that the lifetime of the excimer laser is increased.

5. The excimer laser of claim 4, wherein at least one of said optical surfaces comprises surfaces on a window of said pressure vessel.

6. The excimer laser of claim 5, wherein said window is rotatable.

7. The excimer laser of claim 4, wherein at least one of said first and second reflective elements comprises a mirror, and wherein at least one of said optical surfaces comprises a reflective surface on said mirror.

* * * * *